United States Patent
Seko et al.

(10) Patent No.: US 11,499,674 B2
(45) Date of Patent: Nov. 15, 2022

(54) ELECTRIC POWER TOOL

(71) Applicant: Panasonic Intellectual Property Management Co., Ltd., Osaka (JP)

(72) Inventors: Shinji Seko, Mie (JP); Hidenori Shimizu, Mie (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 90 days.

(21) Appl. No.: 17/214,653

(22) Filed: Mar. 26, 2021

(65) Prior Publication Data
US 2021/0301977 A1    Sep. 30, 2021

(30) Foreign Application Priority Data

Mar. 31, 2020  (JP) .............................. JP2020-064781

(51) Int. Cl.
| | |
|---|---|
| *F16N 31/00* | (2006.01) |
| *B25F 5/00* | (2006.01) |
| *B25B 21/02* | (2006.01) |

(52) U.S. Cl.
CPC .............. *F16N 31/00* (2013.01); *B25F 5/008* (2013.01); *B25B 21/02* (2013.01); *B25F 5/001* (2013.01); *F16N 2210/00* (2013.01)

(58) Field of Classification Search
CPC .............. B25F 5/001; B25F 5/008; B25F 1/00
See application file for complete search history.

(56) References Cited

U.S. PATENT DOCUMENTS

| | | | |
|---|---|---|---|
| 2013/0255982 A1 | 10/2013 | Takahashi et al. | |
| 2021/0039242 A1* | 2/2021 | Ogura | ................... H02K 11/33 |

FOREIGN PATENT DOCUMENTS

| | | |
|---|---|---|
| CN | 208316452 U | 1/2019 |
| DE | 202013100610 U1 | 3/2013 |
| EP | 0305037 A1 | 3/1989 |
| JP | 2015-016551 A | 1/2015 |
| JP | 2018-144778 A | 9/2018 |

OTHER PUBLICATIONS

Extended European Search Report issued ssued in corresponding European Patent Application No. 21165179.9, dated Aug. 10, 2021.

* cited by examiner

*Primary Examiner* — Anna K Kinsaul
*Assistant Examiner* — Daniel Jeremy Leeds
(74) *Attorney, Agent, or Firm* — McDermott Will & Emery LLP

(57) ABSTRACT

An electric power tool includes a holder, a motor, and a transmission mechanism. The motor includes a stator and a rotor. The rotor includes a rotary shaft and a rotor body. The rotary shaft is coupled to the transmission mechanism. The rotator includes at least the rotor body. The rotator rotates. The electric power tool further includes an absorbing member. The absorbing member has a property to absorb a lubricant. The absorbing member is arranged between the rotator and the transmission mechanism.

13 Claims, 6 Drawing Sheets

ELECTRIC POWER TOOL

CROSS-REFERENCE TO RELATED APPLICATIONS

The present application is based upon, and claims the benefit of priority to, Japanese Patent Application No. 2020-064781, filed on Mar. 31, 2020, the entire contents of which are hereby incorporated by reference.

TECHNICAL FIELD

The present disclosure generally relates to an electric power tool, and more particularly relates to an electric power tool for holding a tip tool.

BACKGROUND ART

JP 2015-016551 A discloses an electric power tool including: a motor as a drive source; a speed reducer mechanism for transmitting the rotational power of the motor after having reduced its speed; and a drive transmission for transmitting the rotational power provided via the speed reducer mechanism to an output shaft.

In the electric power tool of JP 2015-016551 A, however, if a lubricant is applied to the speed reducer mechanism or the drive transmission, for example, the lubricant could flow to reach the motor (rotator). Thus, the lubricant could be scattered around the motor due to the rotational power of the motor.

SUMMARY

The present disclosure provides an electric power tool with the ability to reduce the chances of a lubricant being scattered around.

An electric power tool according to an aspect of the present disclosure includes a holder, a motor, and a transmission mechanism. The holder holds a tip tool thereon. The motor includes a stator and a rotor. The rotor rotates with respect to the stator. The transmission mechanism transmits rotational power of the rotor to the tip tool. The rotor includes a rotary shaft and a rotor body. The rotary shaft is coupled to the transmission mechanism. The rotor body rotates along with the rotary shaft. The electric power tool includes a rotator. The rotator includes at least the rotor body. The rotator rotates. The electric power tool further includes an absorbing member. The absorbing member has a property to absorb a lubricant. The absorbing member is arranged between the rotator and the transmission mechanism.

BRIEF DESCRIPTION OF DRAWINGS

The figures depict one or more implementations in accordance with the present teaching, by way of example only, not by way of limitations. In the figures, like reference numerals refer to the same or similar elements.

DETAILED DESCRIPTION

Embodiments

An electric power tool 1 according to an exemplary embodiment will now be described with reference to the accompanying drawings. Note that the embodiment to be described below is only an exemplary one of various embodiments of the present disclosure and should not be construed as limiting. Rather, the exemplary embodiment may be readily modified in various manners depending on a design choice or any other factor without departing from the scope of the present disclosure. The drawings to be referred to in the following description of embodiments are all schematic representations. That is to say, the ratio of the dimensions (including thicknesses) of respective constituent elements illustrated on the drawings does not always reflect their actual dimensional ratio.

(1) Overview

Figure 1:
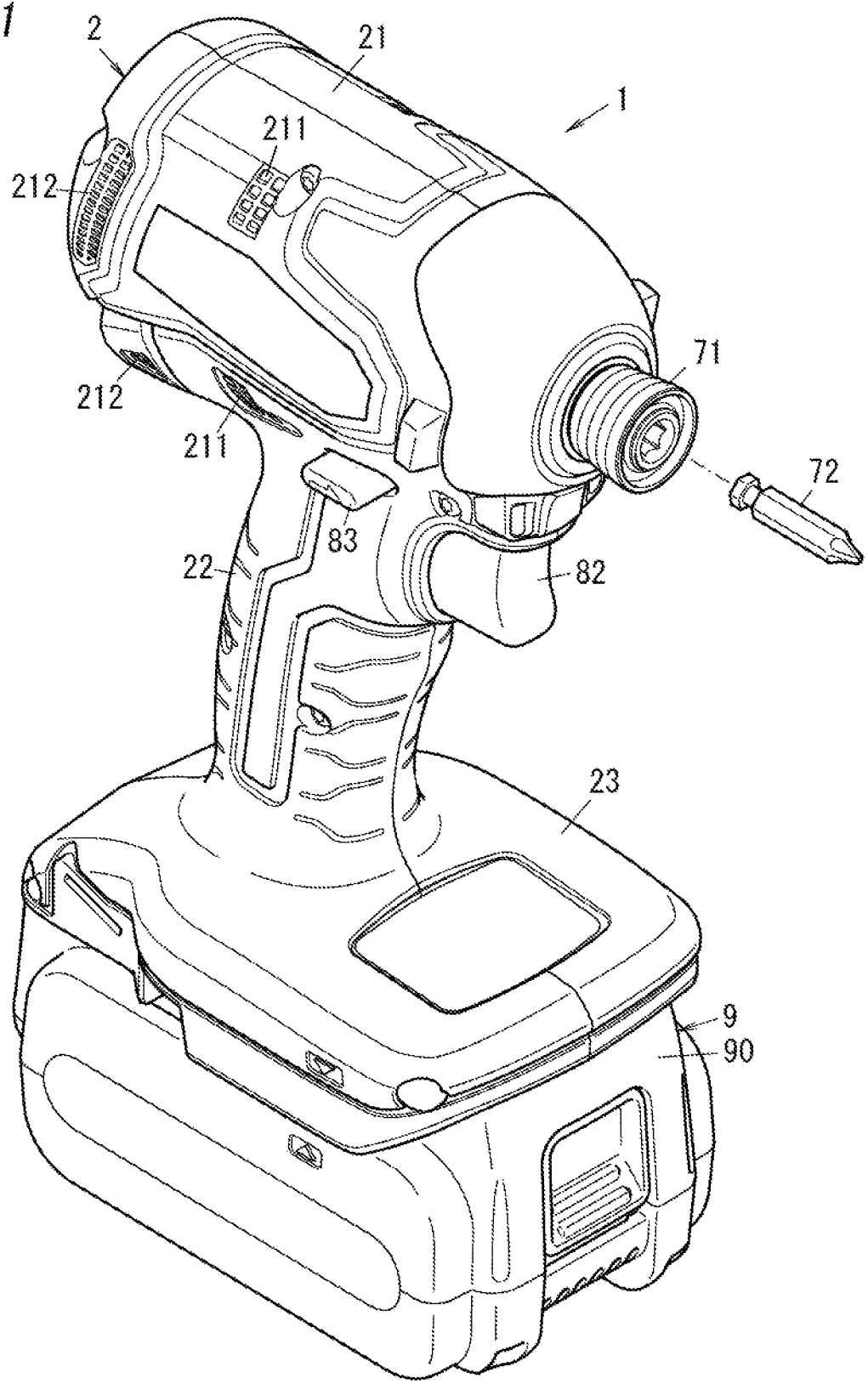
FIG. 1 is a perspective view of an electric power tool according to an exemplary embodiment.
Figure 2:
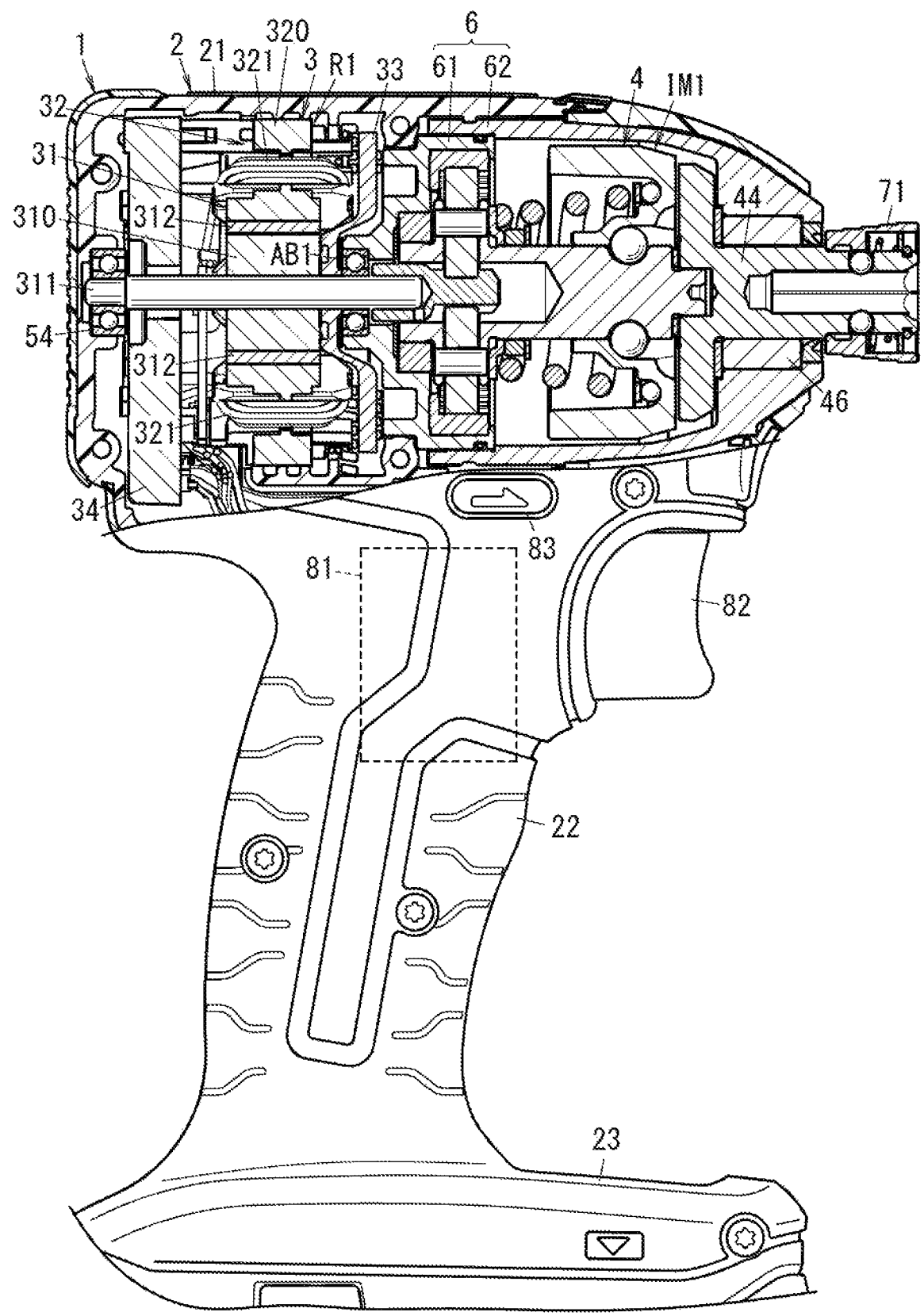
FIG. 2 is a cross-sectional view of the electric power tool.

As shown in FIGS. 1 and 2, an electric power tool 1 according to this embodiment includes a holder 71, a motor 3, and a transmission mechanism 4. The holder 71 holds a tip tool 72 thereon. The motor 3 includes a stator 32 and a rotor 31. The rotor 31 rotates with respect to the stator 32. The transmission mechanism 4 transmits rotational power of the rotor 31 to the tip tool 72. The rotor 31 includes a rotary shaft 311 and a rotor body 310. The rotary shaft 311 is coupled to the transmission mechanism 4. The rotor body 310 rotates along with the rotary shaft 311. The electric power tool 1 includes a rotator R1. The rotator R1 includes at least the rotor body 310. The rotator R1 rotates. The electric power tool 1 further includes an absorbing member AB1. The absorbing member AB1 has the property to absorb a lubricant. The absorbing member AB1 is arranged between the rotator R1 and the transmission mechanism 4.

This embodiment allows, when a lubricant is applied to either the transmission mechanism 4 or a surrounding member thereof, the absorbing member AB1 to reduce the chances of the lubricant flowing so far as to reach the rotator R1. This reduces the chances of the lubricant being scattered around the rotator R1 due to the rotational power of the rotator R1.

In this embodiment, the rotator R1 includes the rotor body 310 and a fan 33. That is to say, the rotator R1 further includes the fan 33. The fan 33 rotates along with the rotor body 310.

(2) Details

The electric power tool 1 is a portable electric power tool which may be gripped by the user with one of his or her hands.

As shown in FIG. 2, the electric power tool 1 according to this embodiment includes the motor 3, the transmission mechanism 4, a case 6, and a housing 2. The transmission mechanism 4 transmits the rotational power of the rotary shaft 311 of the motor 3 to the tip tool 72 (see FIG. 1). The case 6 houses the transmission mechanism 4 at least partially. The housing 2 houses the motor 3, the transmission mechanism 4, and the case 6 therein.

The electric power tool 1 includes the holder 71 to hold thereon a bit (driver bit) serving as the tip tool 72. The tip tool 72 is attached removably onto the holder 71. The transmission mechanism 4 drives the tip tool 72 using the rotational power of the motor 3. In the electric power tool 1 according to this embodiment, the transmission mechanism 4 includes an impact mechanism IM1. The electric power tool 1 according to this embodiment is implemented as an electric impact driver allowing the user to tighten screws with the striking force applied by the impact mechanism IM1.

To the electric power tool 1, a battery pack 9 of a rechargeable type (see FIG. 1) is attached so as to be readily removable from the electric power tool 1. The electric power tool 1 is powered by the battery pack 9. In this embodiment, the battery pack 9 is not a constituent element of the electric power tool 1. However, this is only an example and should not be construed as limiting. Alternatively, the electric power tool 1 may include the battery pack 9 as a constituent element. The battery pack 9 includes an assembled battery formed by connecting a plurality of secondary batteries (such as lithium-ion batteries) in series, and a battery pack case 90 that houses the assembled battery. The battery pack 9 includes a communications connector for transmitting battery information about the battery pack 9. Examples of the battery information include various pieces of information about the temperature, battery level, rated voltage, rated capacity, and number of times of charging.

As shown in FIGS. 1 and 2, the housing 2 of the electric power tool 1 includes a body portion 21, a grip portion 22, and a base portion 23. The body portion 21 has a hollow cylindrical shape. The grip portion 22 protrudes, in one direction aligned with a radius of the body portion 21, from an outer peripheral surface of the body portion 21. The grip portion 22 is formed in the shape of a hollow cylinder elongated in the one direction. The internal space of the grip portion 22 communicates with the internal space of the body portion 21. The body portion 21 is connected to one longitudinal end of the grip portion 22 and the base portion 23 is connected to the other longitudinal end of the grip portion 22. The battery pack 9 is attached to the base portion 23 so as to be readily removable from the base portion 23.

As shown in FIG. 2, the electric power tool 1 further includes a switch circuit module 81, an operating switch 82, and a forward/reverse switch (direction switch) 83. The electric power tool 1 further includes a control circuit module.

The switch circuit module 81 is arranged in the internal space of the grip portion 22. The switch circuit module 81 is connected to the control circuit module. The control circuit module is housed in the base portion 23.

The switch circuit module 81 includes a main switch. The main switch is used to open or close a power supply path for supplying power from the battery pack 9 to the motor 3. The operating switch 82 is a trigger lever to be operated by the user of the electric power tool 1 with one of his or her fingers. The operating switch 82 is operatively coupled to the switch circuit module 81. The operating switch 82 is pulled toward the grip portion 22 when operated by the user with one of his or her fingers.

The switch circuit module 81 turns the main switch OFF when finding the depth of the operating switch 82 pulled equal to or less than a predetermined value but turns the main switch ON when finding the depth of the operating switch 82 pulled greater than the predetermined value. This allows the switch circuit module 81 to selectively supply or cut off power from the battery pack 9 to the motor 3. In addition, when finding the depth of the operating switch 82 pulled greater than the predetermined value, the switch circuit module 81 also transmits a command signal, corresponding to the depth of the operating switch 82 pulled, to the control circuit module. This causes the magnitude of the power supplied to the motor 3 to be varied according to the depth of the operating switch 82 pulled, thus changing the rotational velocity of the rotary shaft 311 of the motor 3.

In addition, the switch circuit module 81 is also connected to the forward/reverse switch 83. The forward/reverse switch 83 is a direction switch allowing the user to change the rotational direction of the rotary shaft 311 of the motor 3. The forward/reverse switch 83 is provided in the vicinity of the boundary between the body portion 21 and the grip portion 22.

The control circuit module is connected to the switch circuit module 81 and the motor 3. With the battery pack 9 attached to the electric power tool 1, the control circuit module is connected to a pair of power terminals and a communications connector of the battery pack 9. This allows the control circuit module to be supplied with power from the battery pack 9 via the pair of power terminals. In addition, the control circuit module acquires the battery information from the battery pack 9 via the communications connector. Furthermore, the control circuit module controls the motor 3 in accordance with the command signal supplied from the switch circuit module 81. More specifically, the control circuit module controls the rotational velocity, rotational direction, and other parameters of the rotary shaft 311 of the motor 3.

The motor 3 is implemented as a brushless motor. The motor 3 includes the rotor 31 and the stator 32. The rotor 31 includes the rotor body 310, the rotary shaft 311, and a plurality of permanent magnets 312. The stator 32 includes a stator body 320 and a plurality of coils 321.

The rotor body 310 is a rotor core made of a magnetic material. The rotary shaft 311 and the plurality of permanent magnets 312 are held by the rotor body 310. The rotary shaft 311 and the plurality of permanent magnets 312 rotate along with the rotor body 310.

The stator body 320 is a stator core made of a magnetic material. The stator body 320 is arranged around the rotor body 310. That is to say, the stator body 320 surrounds the rotor body 310. The plurality of coils 321 are wound around the stator body 320.

The rotor 31 rotates with respect to the stator 32. That is to say, when the magnetic flux generated from the plurality of coils 321 is applied to the plurality of permanent magnets 312, the rotor 31 rotates. The rotational power (driving force) of the rotor 31 is transmitted from the rotary shaft 311 to the transmission mechanism 4.

The electric power tool 1 includes the fan 33 and a driver circuit module 34. The fan 33 and the driver circuit module 34 are housed in the housing 2. More specifically, the fan 33 and the driver circuit module 34 are housed in the body portion 21 of the housing 2.

Figure 3:
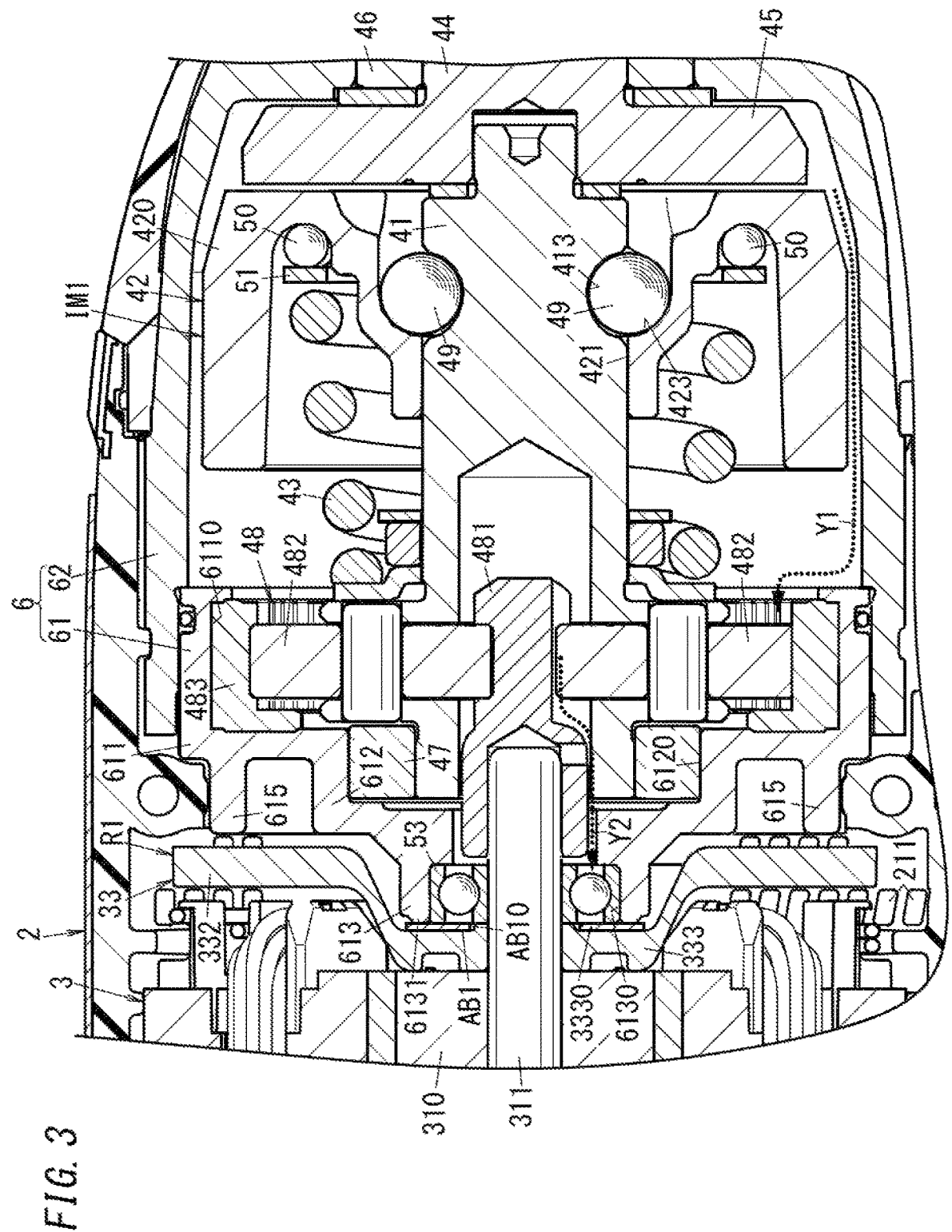
FIG. 3 is a cross-sectional view illustrating a principal part of the electric power tool.
Figure 5:
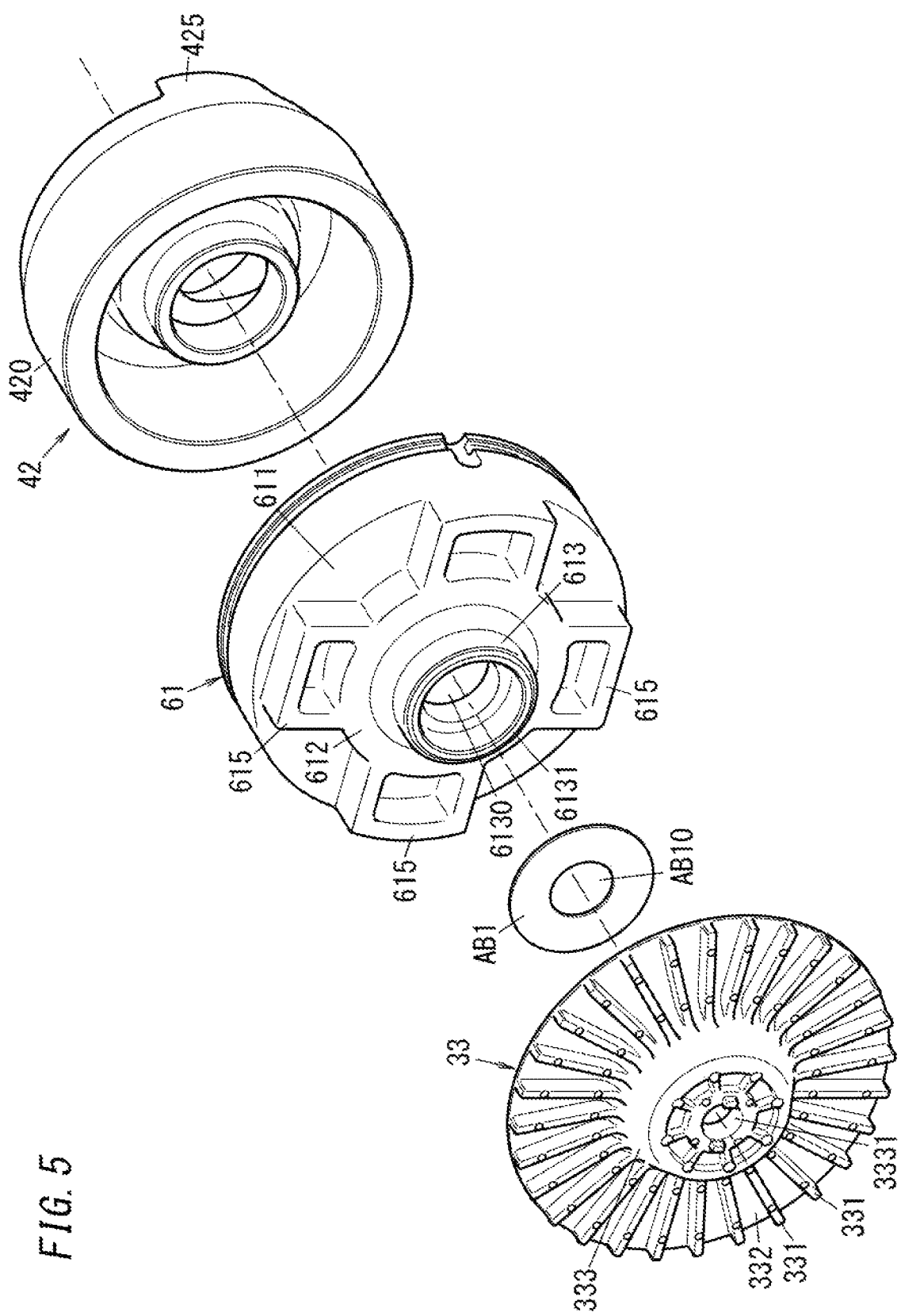
FIG. 5 is an exploded perspective view illustrating the principal part of the electric power tool as viewed from behind the electric power tool.

As shown in FIGS. 3 and 5, the fan 33 includes a plurality of blades 331, an annular portion 332, and a hub 333. The hub 333 has the shape of a bottomed cylinder. The bottom surface 3330 of the hub 333 has a through hole 3331, through which the rotary shaft 311 of the motor 3 is passed. The hub 333 is coupled to the rotary shaft 311 of the motor 3. This allows the fan 33 to rotate along with the rotary shaft 311 and the rotor body 310.

The annular portion 332 has the shape of an annular plate in a plan view. The hub 333 protrudes from an inner edge of the annular portion 332 toward the rotor body 310. The plurality of blades 331 protrude from the surface of the annular portion 332 (i.e., the surface facing the rotor body 310) toward the rotor body 310. The plurality of blades 331 are arranged radially.

The driver circuit module 34 shown in FIG. 2 is controlled by the control circuit module to drive the motor 3. The driver circuit module 34 includes a circuit board, a plurality of transistors mounted on the circuit board, and an encapsulant that encapsulates the circuit board and the plurality of transistors together.

Along the (longitudinal) axis of the rotary shaft 311, arranged in this order are the driver circuit module 34, the rotor body 310, the fan 33, the absorbing member AB1, and the transmission mechanism 4.

The housing 2 houses the motor 3 and the transmission mechanism 4 therein. The housing 2 further houses the case 6. More specifically, the motor 3, the transmission mechanism 4, and the case 6 are housed in the body portion 21 of the housing 2. The body portion 21 has a plurality of vents 211, 212 (see FIG. 1). The vents 211, 212 are provided at a position where the vent 211, 212 faces the rotator R1 and/or a position where the vent 211, 212 is located opposite from the transmission mechanism 4 with respect to the rotator R1 (i.e., located closer to the driver circuit module 34 than to the transmission mechanism 4 with respect to the rotator R1). In this embodiment, a plurality of vents 211 are provided to face the rotator R1 and a plurality of vents 212 are provided opposite from the transmission mechanism 4 with respect to the rotator R1.

As shown in FIG. 3, the transmission mechanism 4 includes a drive shaft 41, a hammer 42, a coil spring 43, a spindle 44, a striking portion 45, a first bearing 46, a second bearing 47, a planetary gear mechanism 48, and two steel spheres 49.

The rotary shaft 311 of the motor 3 is coupled to the planetary gear mechanism 48. The rotational power of the rotary shaft 311 of the motor 3 is transmitted to the drive shaft 41 via the planetary gear mechanism 48. The impact mechanism IM1 of the transmission mechanism 4 includes the drive shaft 41, the hammer 42, the coil spring 43, the spindle 44, the striking portion 45, and the two steel spheres 49. The rotational power of the rotary shaft 311 of the motor 3 is transmitted by the impact mechanism IM1 to the spindle 44. The tip of the spindle 44 also serves as a part of the holder 71 (see FIG. 2).

The distance between the motor 3 and the second bearing 47 is shorter than the distance between the motor 3 and the first bearing 46. The drive shaft 41 is supported rotatably by the second bearing 47. The spindle 44 is supported rotatably by the first bearing 46. The drive shaft 41 is coupled to the spindle 44. Thus, the spindle 44 rotates along with the drive shaft 41.

The hammer 42 has a hammer body 420. The hammer body 420 has a through hole 421 to pass the drive shaft 41 therethrough. The hammer body 420 has a groove 423 on an inner peripheral surface of the through hole 421. The two steel spheres 49 are inserted between the groove 423 and a groove 413 provided on the outer peripheral surface of the drive shaft 41. This causes the two steel spheres 49 to roll along the groove 413, thus allowing the hammer 42 to move along the axis of the drive shaft 41 and rotate with respect to the drive shaft 41. In this transmission mechanism 4, as the hammer 42 rotates with respect to the drive shaft 41, the hammer 42 moves along the axis of the drive shaft 41 either toward, or away from, the spindle 44 according to the angle of rotation of the hammer 42.

The hammer 42 has two projections 425 (see FIG. 6) protruding from a surface 424 (see FIG. 6), facing the spindle 44, of the hammer body 420. The hammer body 420 has a circular columnar shape. The two projections 425 are arranged at generally regular intervals along the circumference of the hammer body 420. The two projections 425 may strike the striking portion 45 (i.e., may collide against the striking portion 45). When viewed from one axial end of the drive shaft 41, each of the two projections 425 has a fan shape. The striking portion 45 forms an integral part of the spindle 44.

The coil spring 43 is arranged between the hammer 42 and the planetary gear mechanism 48. The coil spring 43 is a conical coil spring. The impact mechanism IM1 further includes a plurality of steel spheres 50 and a ring 51 which are inserted between the hammer 42 and the coil spring 43. This allows the hammer 42 to rotate with respect to the coil spring 43. The hammer 42 receives, from the coil spring 43, biasing force applied along the axis of the drive shaft 41 toward the striking portion 45.

In this impact mechanism IM1, every time the drive shaft 41 roughly makes a half turn, the hammer 42 collides against the striking portion 45. After the collision, the drive shaft 41 continues to rotate under the driving force of the motor 3 and the hammer 42 moves away from the spindle 44 while compressing the coil spring 43. This allows the hammer 42 to go over the striking portion 45 to cause the next collision.

The planetary gear mechanism 48 transforms the rotational velocity and torque of the rotary shaft 311 of the motor 3 into a rotational velocity and torque required for tightening or loosening a screw. The planetary gear mechanism 48 is a speed reducer. The planetary gear mechanism 48 includes a sun gear 481, two planetary gears 482, and a ring gear 483. The sun gear 481 is coupled to the rotary shaft 311 of the motor 3. The two planetary gears 482 mesh with the sun gear 481 outside of the sun gear 481. The ring gear 483 meshes with, and supports, the two planetary gears 482.

The electric power tool 1 further includes another bearing 53 (third bearing) and a fourth bearing 54 (see FIG. 2). The distance between the transmission mechanism 4 and the bearing 53 is shorter than the distance between the transmission mechanism 4 and the fourth bearing 54. The bearing 53 and the fourth bearing 54 rotatably support the rotary shaft 311 of the motor 3. The fourth bearing 54 is held by the housing 2.

The case 6 includes an attachment base 61 and a cover 62. The cover 62 is made of an alloy. The cover 62 has a cylindrical shape. The cover 62 surrounds the transmission mechanism 4 at least partially.

The attachment base 61 has electrical insulation properties. The attachment base 61 is made of a synthetic resin. The bearing 53 is attached to the attachment base 61. Inside the attachment base 61, arranged is the planetary gear mechanism 48. The attachment base 61 is coupled to the cover 62 to cover one end (facing toward the motor 3) of the cover 62.

Figure 6:
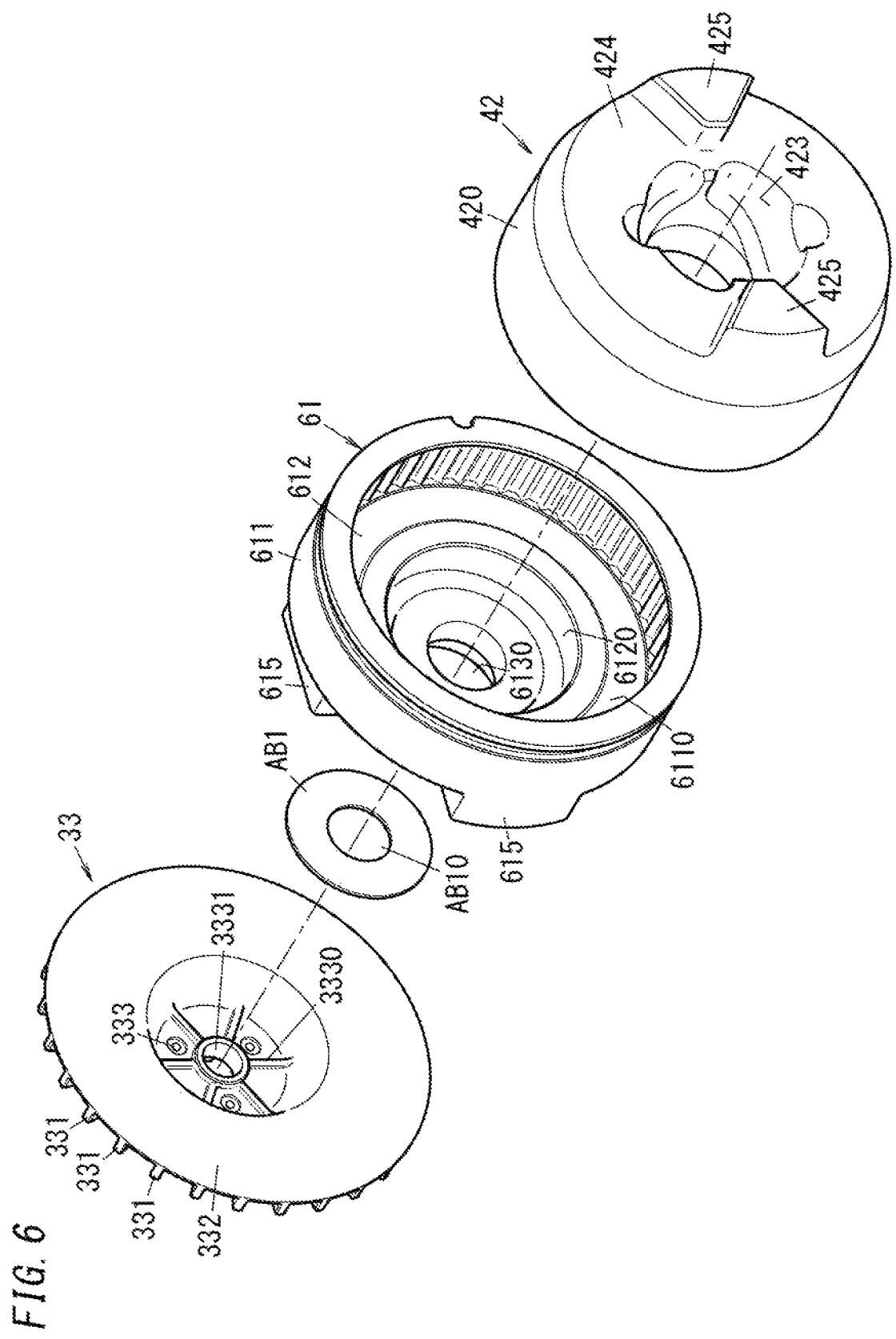
FIG. 6 is an exploded perspective view illustrating the principal part of the electric power tool as viewed from in front of the electric power tool.

As shown in FIGS. 5 and 6, the attachment base 61 has a circular columnar shape. The attachment base 61 is formed to have its outside diameter increased gradually as the distance from the rotor body 310 increases along the axis of the rotary shaft 311 of the motor 3.

The attachment base 61 includes a larger diameter portion 611, a medium diameter portion 612, and a smaller diameter portion 613, of which the outside diameters are different from each other. Out of the larger diameter portion 611, the medium diameter portion 612, and the smaller diameter portion 613, the larger diameter portion 611 has the largest outside diameter and the smaller diameter portion 613 has the smallest outside diameter. Along the axis of the rotary shaft 311 of the motor 3, the smaller diameter portion 613 is arranged closer to the rotor body 310 than any of the larger diameter portion 611 or the medium diameter portion 612 is, and the larger diameter portion 611 is arranged more distant from the rotor body 310 than any of the medium diameter portion 612 or the smaller diameter portion 613 is. The larger diameter portion 611, the medium diameter portion 612, and the smaller diameter portion 613 have the shapes of concentric bottomed cylinders. The larger diameter portion 611 has a through hole 6110, the medium diameter portion 612 has a through hole 6120, and the smaller diameter portion 613 has a through hole 6130. These three through holes 6110, 6120, 6130 communicate with each other. The rotary shaft 311 is passed through the through holes 6110, 6120, 6130.

In addition, the attachment base 61 further has a plurality of (e.g., four in the example illustrated in FIG. 5) projections 615. The plurality of projections 615 are arranged at regular intervals along the circumference of the medium diameter portion 612. The plurality of projections 615 are continuous with the medium diameter portion 612.

As shown in FIG. 3, the bearing 53 to support the rotary shaft 311 is arranged in the through hole 6130 of the smaller diameter portion 613. The outside diameter of the bearing 53 is approximately equal to the inside diameter of the through hole 6130.

The smaller diameter portion 613 has a raised portion 6131 at one end thereof opposite from the medium diameter portion 612. The smaller diameter portion 613 protrudes, at the raised portion 6131, toward the rotor body 310. In other words, the attachment base 61 includes the raised portion 6131 protruding toward the rotor body 310. The raised portion 6131 has a ring shape (more specifically, an annular shape).

The second bearing 47 to support the drive shaft 41 is arranged in the through hole 6120 of the medium diameter portion 612. The outside diameter of the second bearing 47 is approximately equal to the inside diameter of the through hole 6120.

The ring gear 483 of the planetary gear mechanism 48 is held by the attachment base 61. The ring gear 483 is insert-molded with respect to the attachment base 61. Thus, the ring gear 483 is fixed to the attachment base 61. The ring gear 483 is arranged in the through hole 6110 of the larger diameter portion 611.

Along the longitudinal axis of the rotary shaft 311, the driver circuit module 34, the rotor body 310, the fan 33, the absorbing member AB1, and the transmission mechanism 4 are arranged in this order. In addition, the bearing 53 and at least part (i.e., the smaller diameter portion 613) of the attachment base 61 are arranged between the absorbing member AB1 and the transmission mechanism 4.

(3) Lubricant

A lubricant is applied to, for example, the planetary gear mechanism 48, the hammer 42, and other members of the transmission mechanism 4. Thus, the lubricant is housed in the case 6. The lubricant is used to reduce the friction and abrasion, for example, of the transmission mechanism 4. The lubricant has electrical insulation properties. The lubricant may be a semisolid lubricant, for example. More specifically, the lubricant may be a synthetic hydrocarbon oil grease.

(4) Absorbing Member

As shown in FIG. 6, the absorbing member AB1 has a sheet shape. The absorbing member AB1 has a ring shape (more specifically, an annular shape) in a plan view. That is to say, the absorbing member AB1 has a through hole AB10. The rotary shaft 311 is passed through the through hole AB10.

The absorbing member AB1 has the property of absorbing the lubricant. A material for the absorbing member AB1 includes nonwoven fabric (felt). In this embodiment, the absorbing member AB1 is made essentially of a piece of nonwoven fabric. As a raw material for the nonwoven fabric, polyester fibers may be used, for example.

The absorbing member AB1 has heat resistance. The absorbing member AB1 is arranged in the vicinity of the bearing 53. The bearing 53 generates heat when sliding on the rotary shaft 311. Thus, the absorbing member AB1 suitably maintains its physical properties under a condition where its temperature is equal to or lower than the highest temperature that the bearing 53 can reach. For example, the absorbing member AB1 suitably maintains its physical properties under a condition where its temperature is equal to or lower than approximately 100° C. As used herein, a temperature of approximately 100° C. refers to a temperature falling within the range from 90° C. to 110° C., for example.

In addition, the absorbing member AB1 also has flame retardance. For example, the absorbing member AB1 may have flame retardance compliant with the UL94-VO standard.

As shown in FIG. 3, the absorbing member AB1 is arranged between the rotor R1 and the transmission mechanism 4. In this embodiment, the rotor R1 includes the rotor body 310 and the fan 33. The fan 33 is arranged between the rotor body 310 and the transmission mechanism 4. The absorbing member AB1 is arranged between the fan 33 and the transmission mechanism 4.

The electric power tool 1 includes a fixing member (attachment base 61) arranged between the rotor R1 and the transmission mechanism 4. The rotor 31 rotates with respect to the fixing member (attachment base 61). The absorbing member AB1 is arranged between the rotor R1 and the fixing member (attachment base 61).

More specifically, the fixing member (attachment base 61) includes a bearing holder stage (smaller diameter portion 613). The bearing holder stage (smaller diameter portion 613) holds the bearing 53 that holds the rotary shaft 311 rotatably. The absorbing member AB1 is arranged between the rotator R1 and the bearing holder stage (smaller diameter portion 613).

The absorbing member AB1 is in contact with the fixing member (attachment base 61). More specifically, the absorbing member AB1 is in contact with the bearing holder stage (smaller diameter portion 613). In addition, the absorbing member AB1 is also in contact with the rotator R1. More specifically, the absorbing member AB1 is in contact with the fan 33. That is to say, the absorbing member AB1 is sandwiched between the smaller diameter portion 613 and the fan 33. In other words, the absorbing member AB1 is sandwiched between the fixing member (attachment base 61) and the rotor R1. The absorbing member AB1 is compressed under the pressure applied by the smaller diameter portion 613 and the fan 33. The smaller diameter portion 613 includes the raised portion 6131 in its portion facing the absorbing member AB1. The smaller diameter portion 613 is in contact with the absorbing member AB1 at the raised portion 6131.

The absorbing member AB1 is fixed to the rotator R1. More specifically, the absorbing member AB1 is fixed to the fan 33 of the rotator R1. That is to say, the absorbing member AB1 is fixed to the bottom surface 3330 (i.e., the surface facing the transmission mechanism 4) of the hub 333 of the fan 33. The absorbing member AB1 may be fixed, for example, with a doubled-sided adhesive tape or an adhesive.

The absorbing member AB1 faces the bearing 53. The absorbing member AB1 is arranged between the bearing 53 and the rotator R1 (fan 33). The inner edge of the bearing 53 is located inside of the inner edge of the through hole AB10 of the absorbing member AB1.

(4) Advantages

Next, advantages of the electric power tool 1 according to this embodiment will be described with reference to FIGS. 3, 4A, and 4B.

As described above, a lubricant is applied to, for example, the planetary gear mechanism 48, the hammer 42, and other members of the transmission mechanism 4. The lubricant may flow to reach the rotator R1 due to the running of the transmission mechanism 4 and vibrations involved with the running. In addition, as the hammer 42 goes back and forth along the axis of the rotary shaft 311, the internal pressure rises in the vicinity of the hammer 42, thus possibly pushing the lubricant toward the rotor body 310. Furthermore, when the amount of the lubricant applied is excessive, the excessive lubricant may flow to reach the rotator R1 as well. Furthermore, when a semisolid lubricant or a solid lubricant is used as the lubricant, the lubricant may be liquefied due to an increase in the temperature inside the housing 2, thus possibly allowing the lubricant to flow more easily.

The lubricant applied to the hammer 42 may be scattered toward the inner surfaces of the cover 62 of the case 6 as the hammer 42 rotates, for example. In addition, due to the vibrations produced by the impact mechanism IM1, the lubricant may flow to reach the attachment base 61 and the planetary gear mechanism 48 (see the path indicated by the arrow Y1 in FIG. 3).

Once the lubricant has adhered to the planetary gears 482 of the planetary gear mechanism 48, the lubricant may run along the planetary gears 482 to adhere to the sun gear 481. Then, the lubricant may run along the sun gear 481 to reach the bearing 53 (see the path indicated by the arrow Y2 in FIG. 3). In addition, the lubricant applied to the sun gear 481, the planetary gears 482, and the ring gear 483 may also reach the bearing 53 in the same way.

No gap is suitably left between the bearing 53 and the rotary shaft 311 or between the bearing 53 and the attachment base 61. Nevertheless, a gap which is wide enough for the lubricant to pass through could be left around the bearing 53 due to, for example, a variation in temperature inside the housing 2 and vibrations produced by the impact mechanism IM1. In that case, the lubricant could pass through the gap around the bearing 53 to reach the rotator R1.

Figure 4A:
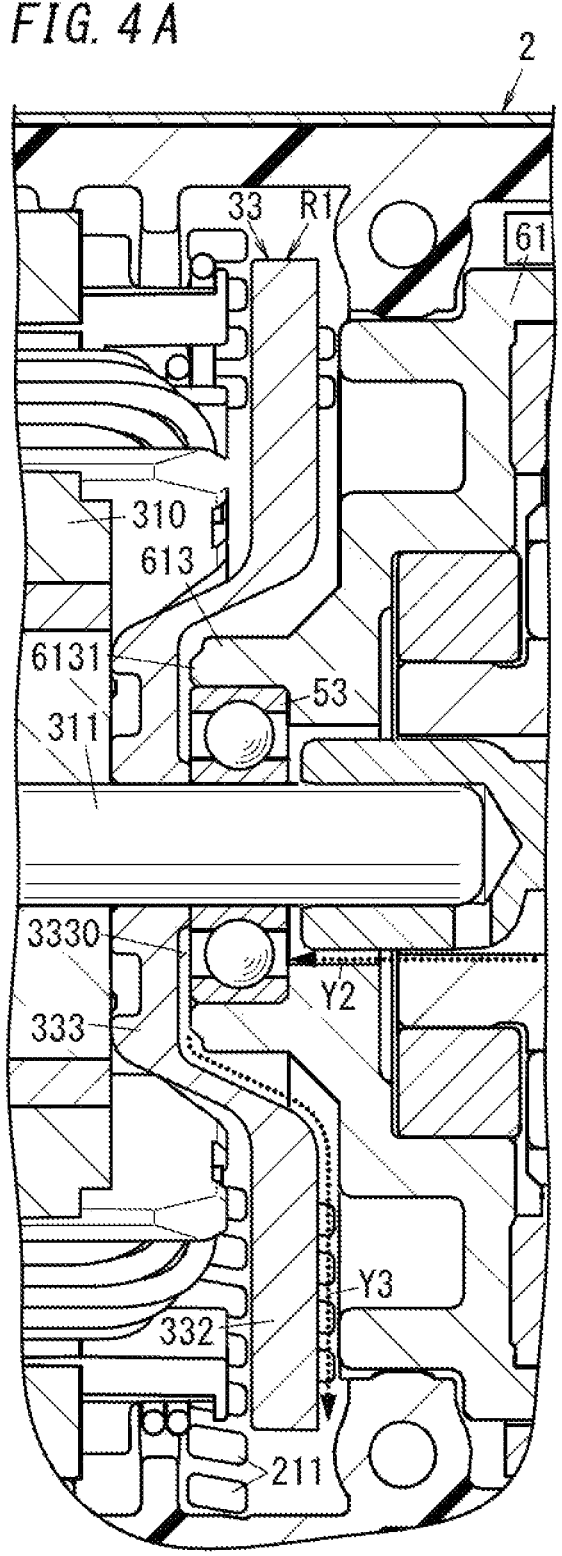
FIG. 4A is a cross-sectional view illustrating a principal part of an electric power tool according to a comparative example.

Were it not for the absorbing member AB1 as shown in FIG. 4A, the lubricant would adhere to the fan 33 of the rotator R1 and could be scattered around the fan 33 due to centrifugal force produced by the fan 33 rotating (see the path indicated by the arrow Y3 in FIG. 4A). In that case, the lubricant could run along the inner surfaces of the housing 2 to adhere to the rotor body 310 or leak out of the housing 2 through the vents 211 and other gaps.

Figure 4B:
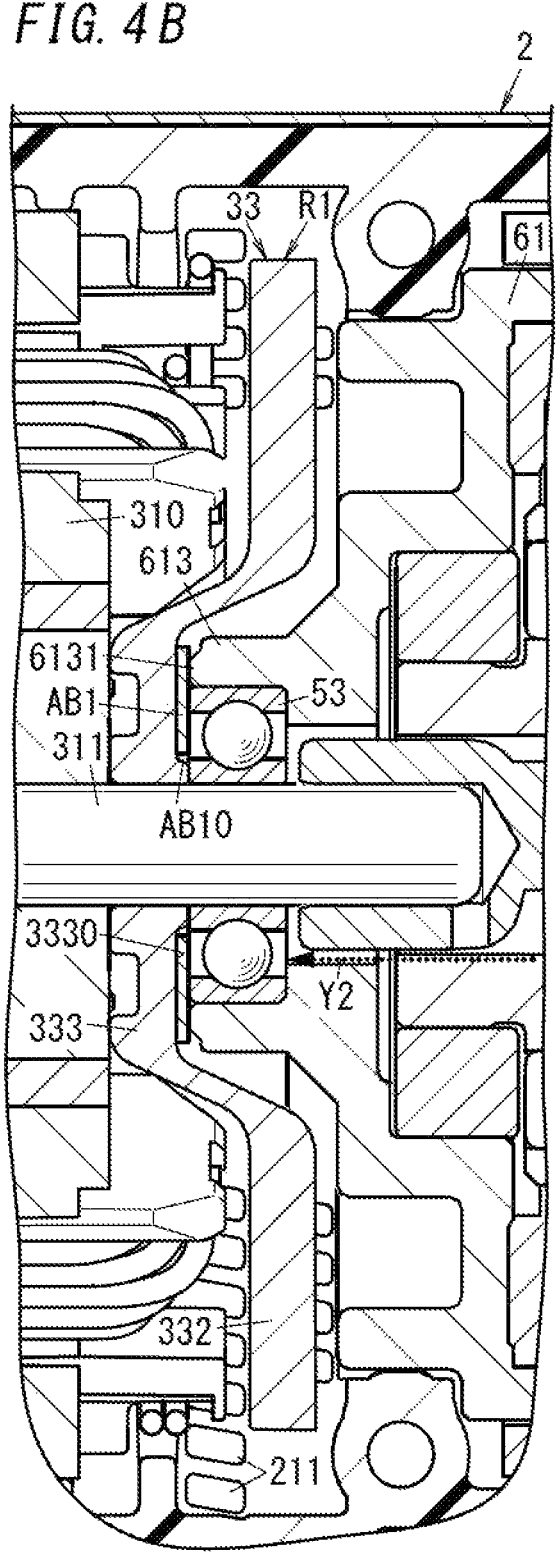
FIG. 4B is a cross-sectional view illustrating a principal part of the electric power tool according to the exemplary embodiment.

In contrast, according to this embodiment, the absorbing member AB1 is provided according to this embodiment as shown in FIG. 4B and may absorb the lubricant thereto. This reduces the chances of the lubricant running along the inner surfaces of the housing 2 to adhere to the rotor body 310 and leaking out of the housing 2 through the vents 211 and other gaps.

Note that when the absorbing member AB1 absorbs a certain volume of the lubricant, the lubricant may aggregate with the lubricant that has already been absorbed into the absorbing member AB1, because the lubricant has an aggregation property. This allows a lubricant, of which the volume is equal to or greater than the volume of lubricant absorbable into the absorbing member AB1 itself, to remain in the absorbing member AB1.

Variations of Exemplary Embodiment

Next, variations of the exemplary embodiment described above will be enumerated one after another. Optionally, the variations to be described below may be adopted in combination as appropriate.

The absorbing member AB1 does not have to be nonwoven fabric (felt) but may also be made of any other suitable material. For example, the absorbing member AB1 may be made of a porous material such as sponge or may also be made of a piece of fabric other than the nonwoven fabric.

The absorbing member AB1 may be fixed onto either the fixing member (attachment base 61) or the rotator R1, whichever is appropriate. Alternatively, the absorbing member AB1 may be fixed to neither the fixing member nor the rotator R1 but may be sandwiched and held between the fixing member and the rotator R1.

The absorbing member AB1 may be in contact with only one of the fixing member (attachment base 61) or the rotator R1. That is to say, a gap may be left between the absorbing member AB1 and the fixing member. Alternatively, a gap may be left between the absorbing member AB1 and the rotator R1.

The absorbing member AB1 does not have to be arranged as already described for the exemplary embodiment. Alternatively, the absorbing member AB1 may also be arranged between the bearing 53 and the attachment base 61 (fixing member), between the attachment base 61 and the transmission mechanism 4, or between the transmission mechanism 4 and the bearing 53, for example.

Still alternatively, the absorbing member AB1 may cover the bearing 53 at least partially. For example, if the bearing 53 has an opening, then the absorbing member AB1 may close the opening of the bearing 53. This reduces the chances of the lubricant flowing through the opening.

The electric power tool 1 may have no fans 33. In that case, the absorbing member AB1 may be arranged between the rotor body 310 and the fixing member (attachment base 61), for example.

The fan 33 may be arranged behind the rotor body 310. That is to say, the rotor body 310 may be arranged between the fan 33 and the transmission mechanism 4. In that case, the absorbing member AB1 may be arranged between the rotor body 310 and the fixing member (attachment base 61).

The rotator R1 may include not only the rotor body 310 but also an intermediate member as well. The intermediate member is arranged between the rotor body 310 and the transmission mechanism 4 and turns along with the rotor 31. The fan 33 according to the exemplary embodiment is an exemplary intermediate member.

The electric power tool 1 may include a plurality of absorbing members AB1.

A sealed bearing having a seal to reduce the invasion of foreign particles may also be used as the bearing 53.

The lubricant does not have to be a semisolid lubricant but may also be a liquid lubricant (such as lubricant oil).

The transmission mechanism 4 does not have to have the configuration described above for the exemplary embodiment but may also a gear mechanism different from the planetary gear mechanism 48. Also, the transmission mechanism 4 does not have to include only gears but may also include a clutch plate, for example.

The electric power tool 1 does not have to be an impact driver but may also be an impact wrench, a drill driver, a hammer drill, or a jigsaw, for example.

The tip tool 72 may be attached removably to the holder 71 or may be fixed to the holder 71 integrally, whichever is appropriate.

(Resume)

The embodiment and its variations described above may be specific implementations of the following aspects of the present disclosure.

An electric power tool (1) according to a first aspect includes a holder (71), a motor (3), and a transmission mechanism (4). The holder (71) holds a tip tool (72) thereon. The motor (3) includes a stator (32) and a rotor (31). The rotor (31) rotates with respect to the stator (32). The transmission mechanism (4) transmits rotational power of the rotor (31) to the tip tool (72). The rotor (31) includes a rotary shaft (311) and a rotor body (310). The rotary shaft (311) is coupled to the transmission mechanism (4). The rotor body (310) rotates along with the rotary shaft (311). The electric power tool (1) includes a rotator (R1). The rotator (R1) includes at least the rotor body (310). The rotator (R1) rotates. The electric power tool (1) further includes an absorbing member (AB1). The absorbing member (AB1) has a property to absorb a lubricant. The absorbing member (AB1) is arranged between the rotator (R1) and the transmission mechanism (4).

This configuration allows, when a lubricant is applied to either the transmission mechanism (4) or a surrounding member thereof, the absorbing member (AB1) to reduce the chances of the lubricant flowing so far as to reach the rotator (R1). This reduces the chances of the lubricant being scattered around the rotator (R1) due to the rotational power of the rotator (R1).

An electric power tool (1) according to a second aspect, which may be implemented in conjunction with the first aspect, further includes a fixing member (attachment base 61). The fixing member is arranged between the rotator (R1) and the transmission mechanism (4). The rotor (31) rotates with respect to the fixing member. The absorbing member (AB1) is arranged between the rotator (R1) and the fixing member.

This configuration reduces the chances of the lubricant running along the fixing member (attachment base 61) to reach the rotator (R1).

An electric power tool (1) according to a third aspect, which may be implemented in conjunction with the second aspect, further includes a bearing (53). The bearing (53) holds the rotary shaft (311) rotatably. The fixing member (attachment base 61) includes a bearing holder stage (smaller diameter portion 613). The bearing holder stage holds the bearing (53). The absorbing member (AB1) is arranged between the rotator (R1) and the bearing holder stage.

This configuration reduces the chances of the lubricant running along the bearing holder stage (smaller diameter portion 613) to reach the rotator (R1).

In an electric power tool (1) according to a fourth aspect, which may be implemented in conjunction with the second or third aspect, the absorbing member (AB1) is in contact with the fixing member (attachment base 61).

This configuration reduces the chances of the absorbing member (AB1) being displaced.

In an electric power tool (1) according to a fifth aspect, which may be implemented in conjunction with any one of the first to fourth aspects, the absorbing member (AB1) is in contact with the rotator (R1).

This configuration reduces the chances of the absorbing member (AB1) being displaced.

In an electric power tool (1) according to a sixth aspect, which may be implemented in conjunction with any one of the first to fifth aspects, the absorbing member (AB1) is fixed to the rotator (R1).

This configuration reduces the chances of the absorbing member (AB1) being displaced.

In an electric power tool (1) according to a seventh aspect, which may be implemented in conjunction with any one of the first to sixth aspects, the rotator (R1) further includes a fan (33).

This configuration allows the motor (3) to be ventilated.

In an electric power tool (1) according to an eighth aspect, which may be implemented in conjunction with any one of the first to seventh aspects, the absorbing member (AB1) has a through hole (AB10) to pass the rotary shaft (311) therethrough.

This configuration allows the absorbing member (AB1) to be arranged around the rotary shaft (311).

In an electric power tool (1) according to a ninth aspect, which may be implemented in conjunction with any one of the first to eighth aspects, the absorbing member (AB1) includes nonwoven fabric as a material thereof.

This configuration allows the absorbing member (AB1) to be formed to absorb the lubricant easily.

In an electric power tool (1) according to a tenth aspect, which may be implemented in conjunction with any one of the first to ninth aspects, the absorbing member (AB1) has heat resistance.

This configuration reduces the chances of the absorbing member (AB1) being deteriorated due to the heat generated by the motor (3).

In an electric power tool (1) according to an eleventh aspect, which may be implemented in conjunction with any one of the first to tenth aspects, the absorbing member (AB1) has a sheet shape.

This configuration allows an installation space for the absorbing member (AB1) to be cut down.

An electric power tool (1) according to a twelfth aspect, which may be implemented in conjunction with any one of the first to eleventh aspects, further includes a housing (2). The housing (2) houses the motor (3) and the transmission mechanism (4) therein. The housing (2) has at least one vent (211, 212) provided at a position where the vent (211, 212) faces the rotator (R1) and/or a position where the vent (211, 212) is located opposite from the transmission mechanism (4) with respect to the rotator (R1).

This configuration allows the internal space of the housing (2) to be ventilated while reducing the chances of the lubricant leaking out of the vents (211, 212).

An electric power tool (1) according to a thirteenth aspect, which may be implemented in conjunction with any one of the first to fourth aspects, the absorbing member (AB1) is sandwiched between the rotator (R1) and the fixing member (attachment base 61).

This configuration reduces the chances of the absorbing member (AB1) being displaced.

Note that the constituent elements according to the second through thirteenth aspects are not essential constituent elements for the electric power tool (1) but may be omitted as appropriate.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. An electric power tool comprising:
a holder configured to hold a tip tool thereon;
a motor including a stator and a rotor, the rotor being configured to rotate with respect to the stator; and
a transmission mechanism configured to transmit rotational power of the rotor to the tip tool,
the rotor including: a rotary shaft coupled to the transmission mechanism; and a rotor body configured to rotate along with the rotary shaft,
the electric power tool including a rotator including at least the rotor body and configured to rotate,
the electric power tool further including an absorbing member, the absorbing member having a property to absorb a lubricant and arranged between the rotator and the transmission mechanism.

2. The electric power tool of claim 1, further comprising a fixing member arranged between the rotator and the transmission mechanism, wherein
the rotor is configured to rotate with respect to the fixing member, and
the absorbing member is arranged between the rotator and the fixing member.

3. The electric power tool of claim 2, further comprising a bearing configured to hold the rotary shaft rotatably, wherein
the fixing member includes a bearing holder stage configured to hold the bearing, and
the absorbing member is arranged between the rotator and the bearing holder stage.

4. The electric power tool of claim 2, wherein
the absorbing member is in contact with the fixing member.

5. The electric power tool of claim 1, wherein
the absorbing member is in contact with the rotator.

6. The electric power tool of claim 1, wherein
the absorbing member is fixed to the rotator.

7. The electric power tool of claim 1, wherein
the rotator further includes a fan.

8. The electric power tool of claim 1, wherein
the absorbing member has a through hole configured to pass the rotary shaft therethrough.

9. The electric power tool of claim 1, wherein
the absorbing member includes nonwoven fabric as a material thereof.

10. The electric power tool of claim 1, wherein
the absorbing member has heat resistance.

11. The electric power tool of claim 1, wherein
the absorbing member has a sheet shape.

12. The electric power tool of claim 1, further comprising a housing that houses the motor and the transmission mechanism therein, wherein
the housing has at least one vent provided at a position where the at least one vent faces the rotator and/or a position where the at least one vent is located opposite from the transmission mechanism with respect to the rotator.

13. The electric power tool of claim 2, wherein
the absorbing member is sandwiched between the rotator and the fixing member.

* * * * *